United States Patent
Reist et al.

(10) Patent No.: US 10,215,440 B1
(45) Date of Patent: Feb. 26, 2019

(54) PUMPED TWO PHASE AIR TO AIR HEAT EXCHANGER

(71) Applicant: ADVANCED COOLING TECHNOLOGIES, INC., Lancaster, PA (US)

(72) Inventors: Daniel T. Reist, Mountville, PA (US); Peter Dussinger, Lititz, PA (US); Michael C. Ellis, Marietta, PA (US)

(73) Assignee: ADVANCED COOLING TECHNOLOGIES, INC., Lancaster, PA (US)

( * ) Notice: Subject to any disclaimer, the term of this patent is extended or adjusted under 35 U.S.C. 154(b) by 232 days.

(21) Appl. No.: 15/229,659

(22) Filed: Aug. 5, 2016

Related U.S. Application Data

(60) Provisional application No. 62/202,481, filed on Aug. 7, 2015.

(51) Int. Cl.
*F25D 15/00* (2006.01)
*F24F 12/00* (2006.01)

(52) U.S. Cl.
CPC .......... *F24F 12/002* (2013.01); *F24F 12/003* (2013.01); *F24F 2012/005* (2013.01)

(58) Field of Classification Search
CPC .. F24F 12/002; F24F 12/003; F24F 2012/005; F28D 15/02; F28D 15/025; F28D 15/043; F28D 15/0275
USPC ............ 62/119; 165/104.19, 104.21, 104.22, 165/104.25, 104.28
See application file for complete search history.

(56) References Cited

U.S. PATENT DOCUMENTS

| | | | |
|---|---|---|---|
| 4,057,963 A | 11/1977 | Basiulis | |
| 4,252,185 A | 2/1981 | Kosson | |
| 4,444,249 A | 4/1984 | Cady | |
| 4,470,450 A | 9/1984 | Bizzell et al. | |
| 4,903,761 A * | 2/1990 | Cima | F28D 15/043 122/366 |
| 5,587,880 A | 12/1996 | Phillips et al. | |
| 5,911,272 A | 6/1999 | Cornog et al. | |
| 6,745,830 B2 | 6/2004 | Dinh | |
| 2003/0136555 A1* | 7/2003 | Dinh | F28D 15/0266 165/274 |
| 2007/0163754 A1 | 7/2007 | Dionne et al. | |
| 2012/0186787 A1* | 7/2012 | Dinh | F24F 12/002 165/104.26 |
| 2015/0101330 A1 | 4/2015 | Rice | |

* cited by examiner

*Primary Examiner* — Joseph Trpisovsky
(74) *Attorney, Agent, or Firm* — McNees Wallace & Nurick LLC

(57) ABSTRACT

A heat exchanger and method which is able to perform in different seasons. The heat exchanger has an upper header and a lower header. Multiple heat pipes extend between the upper header and the lower header, with each of the multiple heat pipes having an evaporator section at one end and a condenser section at the opposite end. The direction of heat flow through the multiple heat pipes is variable depending on ambient air conditions applied to the heat exchanger. A pump is provided in fluid communication with the upper header and the lower header. The pump operates when the heat exchanger is operating in a second mode in which the evaporator section is located above the condenser section, and the pump is disabled when the heat exchanger is operating in a first mode in which the condenser section is located above the evaporator section.

21 Claims, 4 Drawing Sheets

PUMPED TWO PHASE AIR TO AIR HEAT EXCHANGER

FIELD OF THE INVENTION

The invention is directed to a two phase heat exchanger and method which is able to perform in different seasons. In particular, the invention is directed to a two phase air to air heat exchanger in which a pump is provided to allow the direction of the heat flow through the heat pipes to be variable depending upon the ambient air conditions.

BACKGROUND OF THE INVENTION

Known vertical air to air heat pipe heat exchangers rely on gravity to return the condensed working fluid from the condenser to the evaporator. For this reason, the condenser must always be located above the evaporator. This works well for seasons when the air stream in the lower duct is hotter than the air stream in the higher duct. However, the known vertical air to air heat pipe heat exchangers do not transfer any energy from the condenser to the evaporator if the evaporator is located above the condenser, as the condensed working fluid from the condenser cannot be returned to the evaporator. Consequently, known vertical air to air heat pipe heat exchangers only work "one way," meaning they can only transfer heat between the streams when positioned in a gravity aided position.

In order to overcome this problem, more complex and expensive heat exchangers have been developed having two separate split coils with a pump provided there between to pump the working fluid between the split coils.

It would, therefore, be beneficial to provide a two phase air to air heat exchanger in which a pump is provided to allow the direction of the heat flow through the heat pipes to be variable depending upon the ambient air conditions.

SUMMARY

An object of the invention is to provide a pumped two phase air to air heat exchanger, having an upper liquid header and a lower liquid header which is able to perform in multiple seasons.

An object of the invention is to provide an air-to-air heat exchanger which includes a series of straight heat pipes with fins on one end which form an evaporator section and fins on the opposite end that form a condenser section, in which the direction of heat flow through the heat pipes is variable depending on the ambient air conditions applied to the heat exchanger.

An object of the invention is to provide a pumped two phase air to air heat exchanger which includes a pump provided to return condensed liquid from the condenser to the evaporator when heat is being input to the upper fin section and removed from the lower fin section.

An object of the invention is to provide an air to air heat pipe heat exchanger with a pumped liquid line for operation when the heat pipes are in the adverse gravity orientation (with the evaporator above the condenser), thereby providing fluid recirculation against gravity.

An object of the invention is to provide an air to air heat pipe heat exchanger in which the upper ends of the pipes being capped, with each pipe having a flow-restrictor tube to direct liquid against the interior wall of the evaporator to facilitate heat transfer.

An embodiment is directed to an air to air heat exchanger which includes an upper header and a lower header. Multiple heat pipes extend between the upper header and the lower header. The heat pipes have first heat transfer sections proximate the upper header and second heat transfer sections proximate the lower header. The first heat transfer sections are provided in a first gas stream, and the second heat transfer sections are provided in a second gas stream. The heat exchanger includes a working fluid and a pump in fluid communication with the upper header and the lower header. The second heat transfer sections are evaporator sections when the air to air heat exchanger is operating in a first mode, in which the second air stream is warmer than the first air stream, wherein the working fluid flows between the second heat transfer sections and the first heat transfer sections under the influence of gravity. The first heat transfer sections are evaporator sections when the air to air heat exchanger is operating in a second mode, in which the first air stream is warmer than the second air stream, wherein the working fluid is pumped by the pump from the lower header to the upper header.

An embodiment is directed to a heat exchanger which has an upper header and a lower header. Multiple heat pipes extend between the upper header and the lower header, with each of the multiple heat pipes having an evaporator section at one end and a condenser section at the opposite end. The direction of heat flow through the multiple heat pipes is variable depending on ambient air conditions applied to the heat exchanger. A pump is provided in fluid communication with the upper header and the lower header. The pump operates when the heat exchanger is operating in a second mode in which the evaporator section is located above the condenser section, and the pump is disabled when the heat exchanger is operating in a first mode in which the condenser section is located above the evaporator section.

An embodiment is directed to a method of exchanging heat in a heat exchanger, the method including: providing multiple heat pipes extending between a first header and a second header, each of the multiple heat pipes having an evaporator section at one end and a condenser section at the opposite end; determining the direction of heat flow through the multiple heat pipes depending on ambient air conditions applied to the heat exchanger; engaging a pump when the evaporator section is located above the condenser section to move a working fluid from the second header to the first header; and allowing the working fluid to be moved under the influence of gravity when the condenser section is located above the evaporator section.

DETAILED DESCRIPTION OF THE INVENTION

Figure 1:
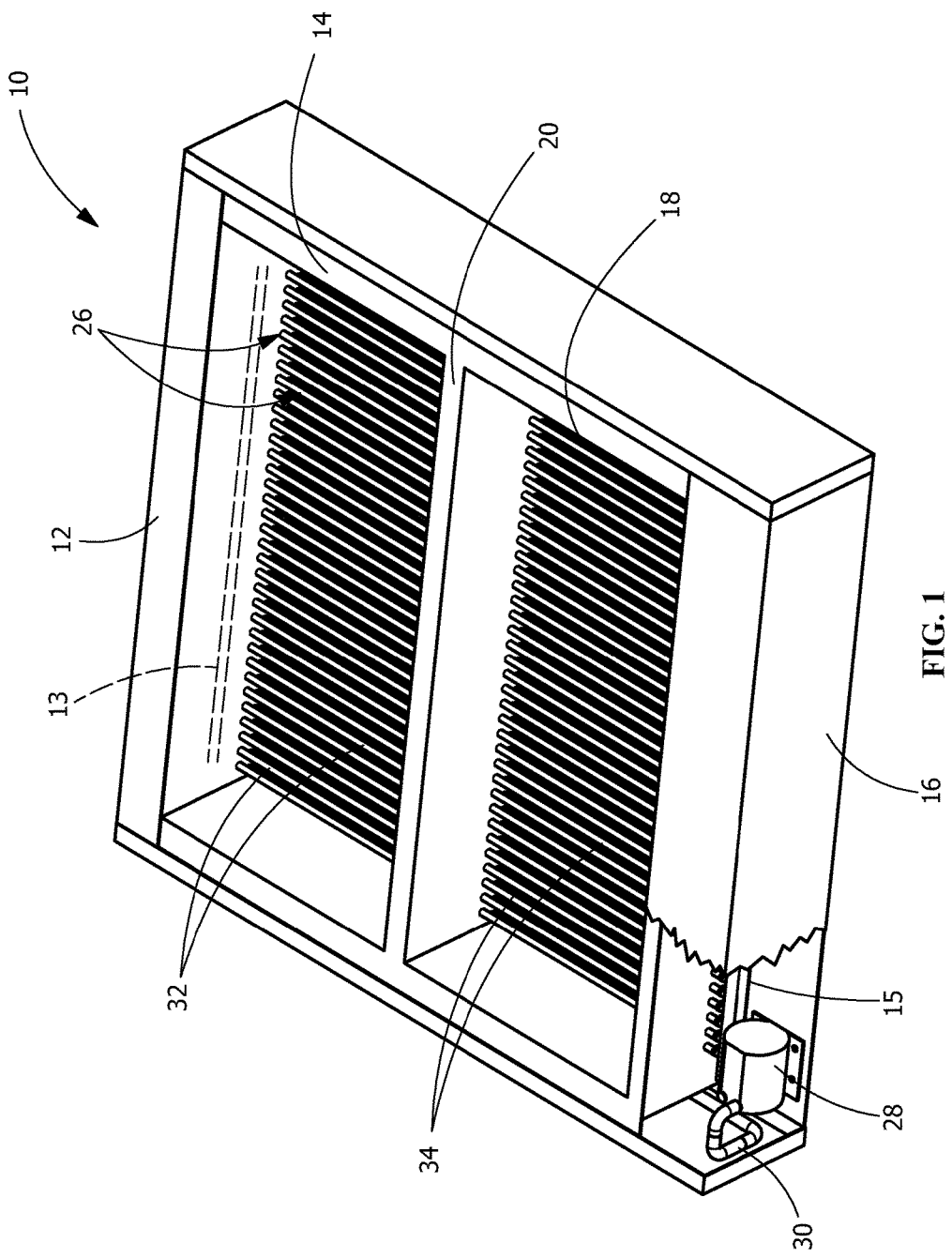
FIG. 1 is a front perspective view of an illustrative embodiment of an air heat pipe heat exchanger of the present invention, the air heat pipe heat exchanger includes a pump to return working fluid to an upper section of the air heat pipe heat exchanger.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

As illustrated in FIG. 1, an illustrative embodiment of an air to air heat exchanger 10 includes an upper liquid header 12 with an upper liquid manifold 13 positioned in an upper compartment 14 of the heat exchanger 10 and a lower liquid header 16 with a lower liquid manifold 15 positioned in a lower compartment 18 of the heat exchanger 10. A wall or other type of partition 20 separates the upper compartment 14 from the lower compartment 18.

Figure 3:
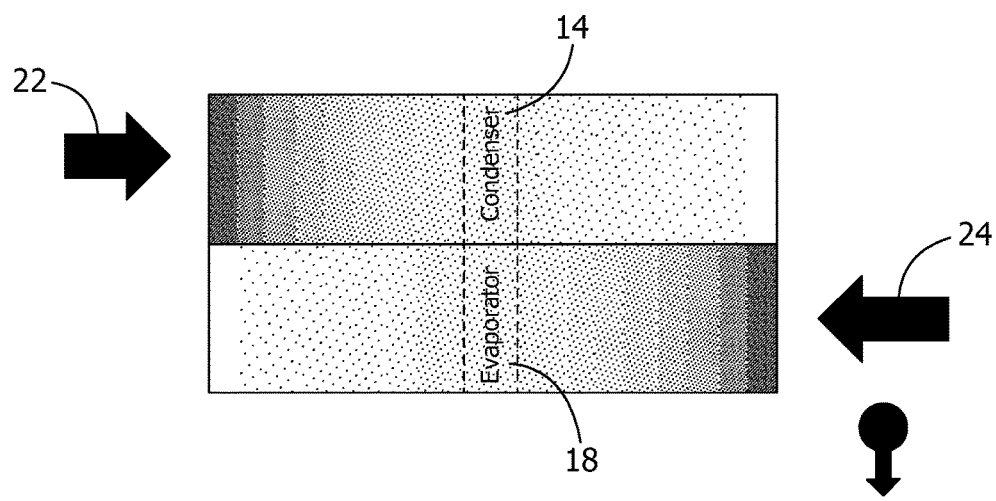
FIG. 3 is a diagrammatic view illustrating the operation of the air heat pipe heat exchanger when warmer air is provided to the lower section of the air heat pipe heat exchanger (for example in the summer), gravity returns the condensed working fluid from the condenser section at the top to the evaporator section at the bottom.
Figure 5:
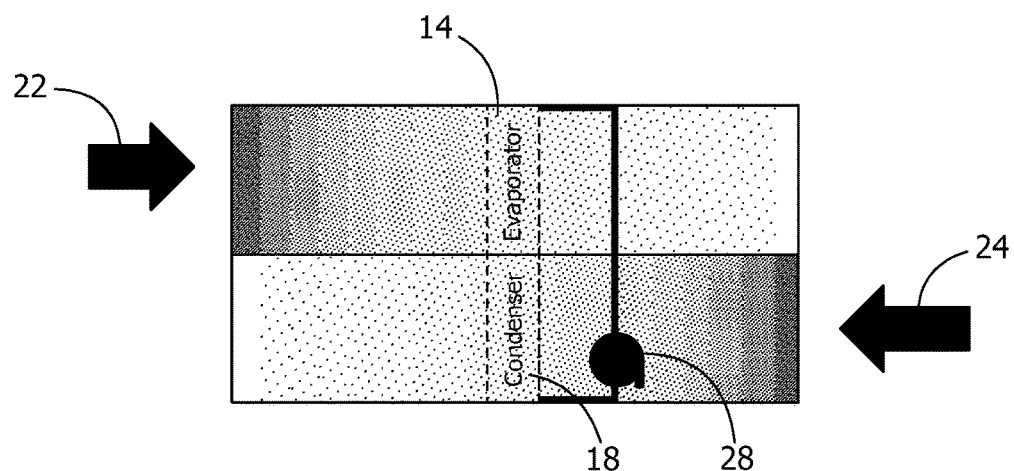
FIG. 5 is a diagrammatic view illustrating the operation of the air heat pipe heat exchanger when warmer air is provided to the upper section of the air heat pipe heat exchanger (for example in the winter), gravity does not return the condensed working fluid from the condenser section at the bottom to the evaporator section at the top.

In general, as represented diagrammatically in FIGS. 3 and 5, the upper compartment 14 receives a first gas stream 22, such as return air, and the lower compartment receives a second gas stream 24, such as outside air. The first gas stream 22 and the second gas stream 24 have no direct fluid contact there between.

A number of heat pipes 26 extend between the upper liquid manifold 13 and the lower liquid manifold 15. The heat pipes 26 extend through the wall 20 provided between the upper compartment 14 and the lower compartment 18. The number of heat pipes 26 may vary depending upon the amount of heating or cooling required. One or more pumps 28 are provided in liquid communication with the lower liquid manifold 15. One or more supply lines or pipes 30 extend from the one or more pumps 28 to the upper liquid manifold 13.

In the embodiment shown, the heat pipes 26 have first heat transfer sections 32 in the upper compartment 14 and second heat transfer sections 34 in the lower compartment 18. The first heat transfer sections 32 are provided proximate the upper liquid manifold 13. The first heat transfer sections 32 are provided in the first gas stream 22 and are in thermal communication with the first gas stream 22. The second heat transfer sections 34 are provided proximate the lower liquid manifold 15. The second heat transfer sections 34 are provided in the second gas stream 24 and are in thermal communication with the second gas stream 24. The heat pipes 26 provide a direct path of heat transfer between the first gas stream 22 and the second gas stream 24.

Fins 36 may be provided in the upper compartment 14, the lower compartment 18 or both. The fins 36 are mechanically and thermally connected to the heat pipes 26. The fins 36 increase the heat transfer between the first gas stream 22 and the heat pipes 26 and the second gas stream 24 and the heat pipes 26, thereby facilitating the heat transfer between the first gas stream 22 and the second gas stream 24.

Figure 4:
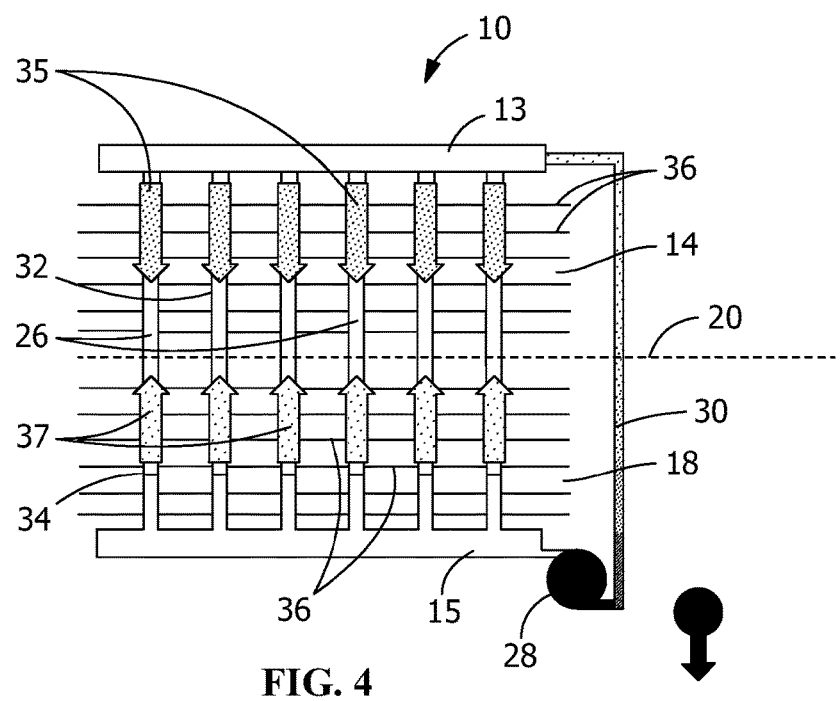
FIG. 4 is an additional diagrammatic view illustrating the operation of the air heat pipe heat exchanger illustrated in FIG. 3, in which the pump is not operating or is in a passive mode.

In use, in a first mode of operation shown in FIGS. 3 and 4, when the second gas stream 24 is warmer than the first gas stream 22, the second heat transfer sections 34 of the lower compartment 18 act as evaporator sections. As this occurs, the heat energy of the second gas stream 24 is absorbed by the refrigerant or working fluid in the second heat transfer sections 34 of the heat pipes 26 and converts the working fluid from a liquid phase to a gas phase 37. Because the latent heat of vaporization of the working fluid is relatively large, considerable quantities of heat energy can be absorbed by the vaporization process with a very small temperature difference. The vaporized working fluid will move inside the heat pipes 26 to the first heat transfer sections 32 of the upper compartment 14 which act as condenser sections. In the first heat transfer sections 32 the working fluid is condensed. The temperature of the working fluid will only change by a small amount during the condensing process. The condensed working fluid 35 will flow under the influence of gravity back to the second heat transfer sections 24 or the evaporator sections. In this first mode of operation, the pump or pumps 28 are not engaged and no fluid is moved by the pumps 28 between the lower liquid manifold 15 and the upper liquid manifold 13.

Figure 6:
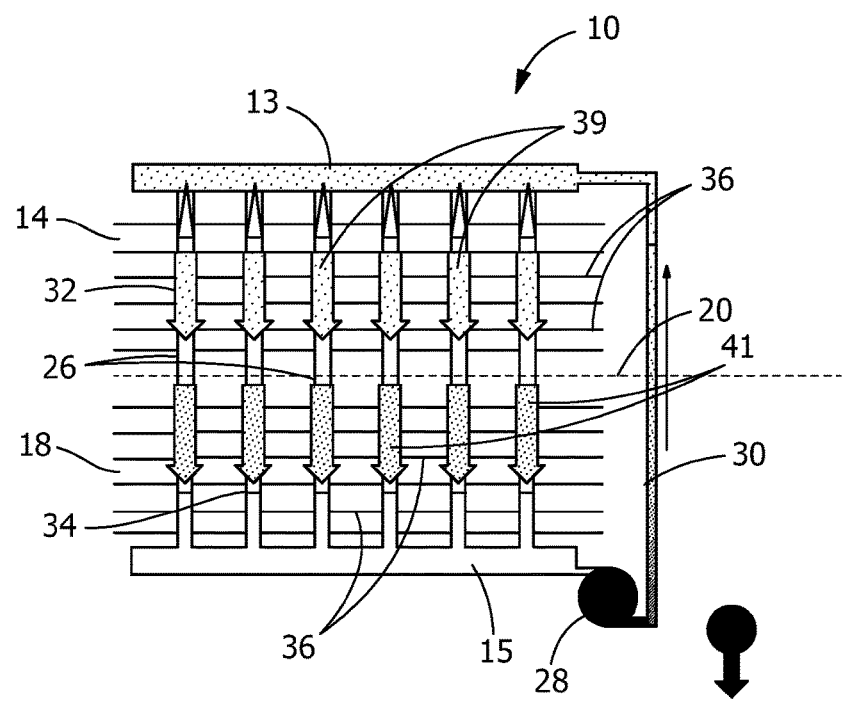
FIG. 6 is an additional diagrammatic view illustrating the operation of the air heat pipe heat exchanger illustrated in FIG. 5, in which the pump is operating or is in a pumped mode.

In a second mode of operation shown in FIGS. 5 and 6, when the first gas stream 22 is warmer than the second gas stream 24, the first heat transfer sections 32 of the upper compartment 14 act as evaporator sections. As this occurs, the heat energy of the first gas stream 22 is absorbed by the working fluid in the first heat transfer sections 32 of the heat pipes 26 and converts the working fluid from a liquid phase to a gas phase 39. Because the latent heat of vaporization of the working fluid is relatively large, considerable quantities of heat energy can be absorbed by the vaporization process with a very small temperature difference. The vaporized working fluid will move, under the influence of gravity, inside the heat pipes 26 to the second heat transfer sections 34 of the lower compartment 18 which act as condenser sections. In the second heat transfer sections 34 the working fluid is condensed. The temperature of the working fluid will only change by a small amount during the condensing process. The condensed working fluid 41 will flow under the influence of gravity to the lower liquid manifold 15 to form a reservoir or pool of working fluid in the lower liquid manifold 15. In this second mode of operation, the pump or pumps are engaged. The pool of working fluid feeds the pumps 28 which transports the subcooled liquid to the upper liquid manifold 13 via the pipe or pipes 30 and the cycle repeats as needed.

Figure 2:
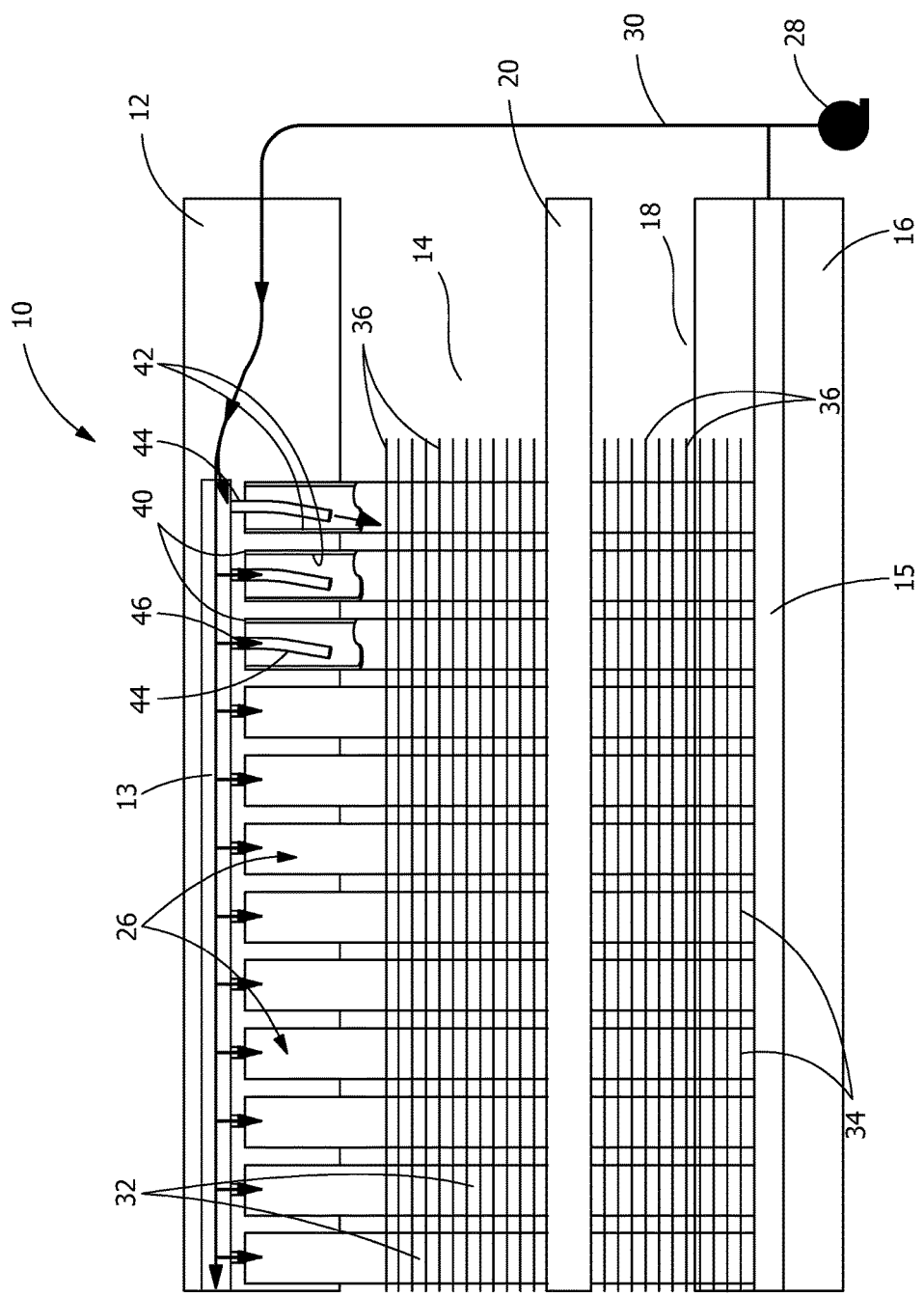
FIG. 2 is a partial cross-sectional view of the air heat pipe heat exchanger of FIG. 1, illustrating flow restrictors extending from a header of the air heat pipe heat exchanger into the heat pipes.

As described, in the second mode of operation, the pumps 28 via the supply lines or pipes 30 and the shared upper liquid manifold 13 moves condensed working fluid back to the first heat transfer sections 32 which acts as the evaporator section of each individual heat pipe 26. The pumps 28 draw the subcooled liquid from the reservoir or pool of working fluid in the shared lower liquid manifold 15 and transports the liquid vertically through the liquid supply lines 30. As best shown in FIG. 2, at the top of the heat exchanger 10, the working fluid or liquid enters the shared upper liquid header 12. The working fluid is distributed evenly to each of the vertical heat pipes 26. The working fluid or liquid enters the top 40 of the heat pipes 26 and is directed to and cooperates with the walls 42 to wet the walls 42 of each first heat transfer sections 32 or evaporator sections of the heat pipes 26. The working fluid is vaporized by the air stream 22 flowing through the system. The resulting vapor flows to the lower pressure condenser section where it condenses and forms the reservoir or pool of working fluid in the lower liquid manifold 15. The cycle continues indefinitely as long as the system, which includes a pump controller, recognizes that the temperature condition requires vertical liquid transport.

The use of the pumps 28 is only necessary when heat is being input to the heat pipes 26 in the first heat transfer sections 32. When the heat is being input into the second heat transfer sections 34, the pumps 28 are turned off and each of the heat pipes 26 operate normally, with gravity returning the condensed working fluid from the top of the heat pipe 26 to the bottom. Some working fluid will remain stagnant in the liquid supply lines 30 and the lower liquid manifold 15 when the system is operating in this mode, thereby providing a mechanism for excess fluid storage.

When operating in the second mode, proper fluid distribution in each of the heat pipes 26 can enhance the performance of the heat exchanger 10 and the system. As best shown in FIG. 2, the interface between the upper liquid manifold 13 and the top 40 of the heat pipes 26 includes tubes or flow restrictors 44 (FIG. 2), such as, but not limited to liquid flow orifice tubes which direct the working fluid from the upper header 22 to the heat pipes 26. In the embodiment shown, the flow restrictors 44 are small diameter tubes that are attached to the top end 40 of the heat pipes 26 near to where the heat pipe 26 interfaces with the upper liquid header 12. The tubes or flow restrictors 44 extend through small diameter openings which extend through end caps 46. The small diameter tubes 44 act as flow restrictors to balance flow between each of the vertical heat pipes 26 and to create a pressure drop between the upper liquid manifold 13 and the heat pipes 26. The tubes 44 also serves to direct or inject the working fluid against the heat pipe walls 42 in the first heat transfer sections 32 rather than allowing the working fluid to flow directly down the center of the heat pipes 26 without contacting the walls of the first heat transfer sections 32. The tubes 44 may promote spraying of the working fluid against the walls 42. As the working fluid meets the walls 42 of the heat pipes 26, the rifled inner surfaces of the walls 42 will help to wet the entire walls 42 of the first heat transfer sections 32 or evaporator sections of the heat pipes 26, allowing the working fluid to be distributed along the length of the heat pipes 26 by capillary action. This better facilitates the vaporization of the working fluid and the flow of the working fluid vapor to the lower pressure second heat transfer sections 34 of the heat pipes 26 where the working fluid condenses to form a pool of working fluid in the lower liquid manifold 15. The pool of working fluid feeds the pumps 28 which transport the subcooled liquid to the upper liquid manifold 13, as previously described, allowing the cycle to repeat as needed.

The method of exchanging heat in a heat exchanger according to the present invention includes: providing multiple heat pipes extending between a first header and a second header, each of the multiple heat pipes having an evaporator section at one end and a condenser section at the opposite end; determining the direction of heat flow through the multiple heat pipes depending on ambient air conditions applied to the heat exchanger; engaging a pump when the heat exchanger when the evaporator section is located above the condenser section to move a working fluid from the second header to the first header; and allowing the working fluid to be moved under the influence of gravity when the condenser section is located above the evaporator section.

The method may also include gathering condensed working fluid in the second header when the evaporator section is located above the condenser section. The method may also include distributing the working fluid to the multiple heat pipes through the first header. The method may also include restricting the flow of the working fluid to the multiple heat pipes to create a pressure drop between the first header and the multiple heat pipes. The method may also include directing the working fluid to walls of the multiple heat pipes.

The heat exchanger as described and claimed herein provides a system that is able to perform in dual seasons while meeting the needs that are commonly requested by customers.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An air to air heat exchanger comprising:
   an upper header;
   a lower header;
   multiple heat pipes extending between the upper header and the lower header, the heat pipes having first heat transfer sections proximate the upper header and second heat transfer sections proximate the lower header, the first heat transfer sections provided in a first gas stream, the second heat transfer sections provided in a second gas stream;
   a working fluid;

a pump in fluid communication with the upper header and the lower header;

the second heat transfer sections are evaporator sections when the air to air heat exchanger is operating in a first mode, in which the second air stream is warmer than the first air stream, wherein the condensed working fluid flows between the second heat transfer sections and the first heat transfer sections under the influence of gravity;

the first heat transfer sections are evaporator sections when the air to air heat exchanger is operating in a second mode, in which the first air stream is warmer than the second air stream, wherein the condensed working fluid is pumped by the pump from the lower header to the upper header.

2. The air to air heat exchanger as recited in claim 1, wherein the second gas stream is ambient air, wherein the direction of the flow of heat through the heat pipes is variable depending on the ambient air conditions applied to the heat exchanger.

3. The air to air heat exchanger as recited in claim 1, wherein the heat exchanger has an upper compartment in which the first heat transfer sections and the first gas stream are located, the heat exchanger has a lower compartment in which the second heat transfer sections and the second gas stream are located.

4. The air to air heat exchanger as recited in claim 3, wherein fins are provided in the upper compartment, the lower compartment or both.

5. The air to air heat exchanger as recited in claim 1, wherein flow restrictors are inserted into the heat pipes, the flow restrictors create a pressure drop between the upper header and the heat pipes.

6. The air to air heat exchanger as recited in claim 5, wherein outlets of the flow restrictors are positioned in the heat pipes, the outlets direct the working fluid to walls of the heat pipes.

7. The air to air heat exchanger as recited in claim 6, wherein the flow restrictors are liquid flow orifice tubes.

8. The air to air heat exchanger as recited in claim 7, wherein the liquid flow orifice tubes extend through end caps of the heat pipes proximate the upper header.

9. The air to air heat exchanger as recited in claim 6, wherein the flow restrictors are liquid nozzles.

10. A heat exchanger comprising:
an upper header;
a lower header;
multiple heat pipes extending between the upper header and the lower header, each of the multiple heat pipes having an evaporator section at one end and a condenser section at the opposite end, the direction of heat flow through the multiple heat pipes is variable depending on ambient air conditions applied to the heat exchanger;
a pump in fluid communication with the upper header and the lower header;
wherein the pump operates when the heat exchanger is operating in a second mode in which the evaporator section is located above the condenser section, and the pump is disabled when the heat exchanger is operating in a first mode in which the condenser section is located above the evaporator section.

11. The heat exchanger as recited in claim 10, wherein fins are provided on the evaporator section, the condenser section or both.

12. The heat exchanger as recited in claim 10, wherein flow restrictors are inserted into the multiple heat pipes, the flow restrictors create a pressure drop between the upper header and the multiple heat pipes.

13. The heat exchanger as recited in claim 12, wherein outlets of the flow restrictors are positioned in the multiple heat pipes, the outlets direct the working fluid to walls of the multiple heat pipes.

14. The heat exchanger as recited in claim 12, wherein the flow restrictors are liquid flow orifice tubes.

15. The heat exchanger as recited in claim 14, wherein the liquid flow orifice tubes extend through end caps of the multiple heat pipes proximate the upper header.

16. A method of exchanging heat in a heat exchanger, the method comprising:
providing multiple heat pipes extending between a first header and a second header, each of the multiple heat pipes having an evaporator section at one end and a condenser section at the opposite end;
determining the direction of heat flow through the multiple heat pipes depending on ambient air conditions applied to the heat exchanger;
engaging a pump when the evaporator section is located above the condenser section to move a condensed working fluid from the second header to the first header;
allowing the condensed working fluid to be moved under the influence of gravity when the condenser section is located above the evaporator section.

17. The method as recited in claim 16, comprising:
gathering condensed working fluid in the second header when the evaporator section is located above the condenser section.

18. The method as recited in claim 17, comprising:
distributing the condensed working fluid to the multiple heat pipes through the first header.

19. The method as recited in claim 18, comprising:
restricting the flow of the condensed working fluid to the multiple heat pipes to create a pressure drop between the first header and the multiple heat pipes.

20. The method as recited in claim 18, comprising:
directing the condensed working fluid to walls of the multiple heat pipes.

21. The method as recited in claim 16, wherein fins are provided on the evaporator section, the condenser section or both.

* * * * *